United States Patent
Pedrick et al.

(10) Patent No.: US 10,620,811 B2
(45) Date of Patent: Apr. 14, 2020

(54) NATIVE APPLICATION COLLABORATION

(71) Applicant: Dropbox, Inc., San Francisco, CA (US)

(72) Inventors: Martin Pedrick, New York, NY (US);
Michael Wu, San Francisco, CA (US);
Anvisha Pai, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 451 days.

(21) Appl. No.: 14/983,847

(22) Filed: Dec. 30, 2015

(65) Prior Publication Data

US 2017/0192656 A1 Jul. 6, 2017

(51) Int. Cl.
*G06F 17/30* (2006.01)
*G06F 3/0484* (2013.01)
*G06F 16/178* (2019.01)
*G06F 3/0481* (2013.01)
*H04L 29/08* (2006.01)

(52) U.S. Cl.
CPC ........ *G06F 3/04847* (2013.01); *G06F 3/0481* (2013.01); *G06F 16/178* (2019.01); *H04L 67/22* (2013.01)

(58) Field of Classification Search
None
See application file for complete search history.

(56) References Cited

U.S. PATENT DOCUMENTS

| | | | |
|---|---|---|---|
| 5,337,407 A | 8/1994 | Bates et al. | |
| 5,960,173 A | 9/1999 | Tang et al. | |
| 6,938,042 B2 * | 8/2005 | Aboulhosn | G06F 16/1834 |
| 7,386,529 B2 | 6/2008 | Kiessig et al. | |
| 7,496,633 B2 | 2/2009 | Szeto et al. | |
| 7,558,797 B2 * | 7/2009 | Li | G06F 17/301 |
| 7,610,280 B2 | 10/2009 | O'Toole et al. | |
| 7,631,007 B2 | 12/2009 | Morris | |
| 7,640,506 B2 | 12/2009 | Pratley | |
| 7,676,526 B1 | 3/2010 | Beloussov et al. | |
| 7,769,810 B1 | 8/2010 | Kaufman | |
| 7,818,419 B1 | 10/2010 | McAllister | |
| 8,055,644 B2 | 11/2011 | Crowley et al. | |

(Continued)

FOREIGN PATENT DOCUMENTS

| CN | 102342080 A | 2/2012 |
|---|---|---|
| JP | H06-214743 A | 8/1994 |

(Continued)

OTHER PUBLICATIONS

PCT International Search Report and Written Opinion, PCT Application No. PCT/IB2016/055286, dated Oct. 31, 2016, 12 pages.

(Continued)

*Primary Examiner* — Jeff A Burke
(74) *Attorney, Agent, or Firm* — Fenwick & West LLP

(57) ABSTRACT

A client device displays a content item in a window associated with a process on the device. A client application monitors the process for the content item and determines whether the content item is synchronized with a client device or content management system. When the content item is not synchronized, a synchronization interface is displayed to permit a user to request synchronizing the content item. When the user requests synchronization, the content item is moved to a shared folder synchronized with the content management system or client device.

20 Claims, 13 Drawing Sheets

(56) References Cited

U.S. PATENT DOCUMENTS

| | | | |
|---|---|---|---|
| 8,140,513 B2* | 3/2012 | Ghods | G06F 9/541 |
| | | | 707/706 |
| 8,230,348 B2 | 7/2012 | Peters et al. | |
| 8,244,830 B2 | 8/2012 | Robinson et al. | |
| 8,301,606 B2 | 10/2012 | Futatsugi | |
| 8,452,959 B2 | 5/2013 | Brown et al. | |
| 8,521,732 B2 | 8/2013 | Wood et al. | |
| 8,543,637 B2 | 9/2013 | Kent et al. | |
| 8,600,934 B2 | 12/2013 | Strong et al. | |
| 8,615,552 B2 | 12/2013 | Shah | |
| 8,655,840 B2 | 2/2014 | Simelius | |
| 8,700,759 B2 | 4/2014 | Chakra | |
| 8,825,597 B1* | 9/2014 | Houston | H04L 67/06 |
| | | | 707/610 |
| 8,868,500 B2 | 10/2014 | Giampaolo et al. | |
| 8,930,488 B2 | 1/2015 | Dantec et al. | |
| 9,021,113 B2 | 4/2015 | Carr et al. | |
| 9,240,962 B2 | 1/2016 | Jung | |
| 9,280,613 B2* | 3/2016 | Smith | H04L 63/08 |
| 9,298,355 B1* | 3/2016 | Beausoleil | G06F 16/252 |
| 9,298,834 B2* | 3/2016 | Kleppner | G06Q 10/10 |
| 9,307,006 B2* | 4/2016 | Micucci | H04L 67/02 |
| 9,338,242 B1 | 5/2016 | Suchland et al. | |
| 9,432,457 B2* | 8/2016 | Marano | G06F 16/178 |
| 9,575,981 B2* | 2/2017 | Dorman | G06F 17/30126 |
| 9,646,023 B1* | 5/2017 | McCabe | G06F 16/1844 |
| 9,652,741 B2* | 5/2017 | Goldberg | G06F 16/178 |
| 9,773,010 B1 | 9/2017 | Ganesh et al. | |
| 9,773,051 B2 | 9/2017 | Smith | |
| 9,998,555 B2 | 6/2018 | Larabie-Belanger | |
| 10,091,287 B2 | 10/2018 | Larabie-Belanger | |
| 10,171,579 B2 | 1/2019 | Larabie-Belanger | |
| 10,270,871 B2 | 4/2019 | Larabie-Belanger | |
| 2003/0018719 A1 | 1/2003 | Ruths et al. | |
| 2003/0159136 A1 | 8/2003 | Huang et al. | |
| 2004/0058710 A1 | 3/2004 | Timmins et al. | |
| 2004/0199514 A1* | 10/2004 | Rosenblatt | G06F 17/30165 |
| 2005/0246544 A1 | 11/2005 | Moore et al. | |
| 2005/0278392 A1 | 12/2005 | Hansen et al. | |
| 2006/0004911 A1 | 1/2006 | Becker et al. | |
| 2006/0101064 A1 | 5/2006 | Strong et al. | |
| 2006/0190117 A1 | 8/2006 | Weczorek et al. | |
| 2007/0168490 A1 | 7/2007 | Kent et al. | |
| 2007/0174787 A1 | 7/2007 | Rhee | |
| 2008/0005188 A1 | 1/2008 | Li et al. | |
| 2008/0005235 A1 | 1/2008 | Hegde et al. | |
| 2008/0109547 A1 | 5/2008 | Bao et al. | |
| 2008/0195759 A1 | 8/2008 | Novik et al. | |
| 2008/0307102 A1 | 12/2008 | Galloway et al. | |
| 2009/0138808 A1* | 5/2009 | Moromisato | G06Q 10/10 |
| | | | 715/758 |
| 2009/0222763 A1 | 9/2009 | Dukhon et al. | |
| 2009/0228504 A1 | 9/2009 | Brown et al. | |
| 2009/0271708 A1 | 10/2009 | Peters et al. | |
| 2009/0288150 A1 | 11/2009 | Toomim et al. | |
| 2009/0292681 A1 | 11/2009 | Wood et al. | |
| 2010/0017879 A1 | 1/2010 | Kuegler et al. | |
| 2010/0131868 A1 | 5/2010 | Chawla et al. | |
| 2010/0138387 A1 | 6/2010 | Simelius | |
| 2010/0198784 A1 | 8/2010 | Serlet | |
| 2010/0198874 A1 | 8/2010 | Futatsugi | |
| 2010/0251340 A1* | 9/2010 | Martin | G06F 9/541 |
| | | | 726/4 |
| 2010/0257457 A1 | 10/2010 | De Goes | |
| 2011/0055177 A1 | 3/2011 | Chakra et al. | |
| 2012/0054279 A1 | 3/2012 | Dantec et al. | |
| 2012/0101980 A1 | 4/2012 | Taleghani et al. | |
| 2012/0124486 A1 | 5/2012 | Robinson et al. | |
| 2012/0185434 A1 | 7/2012 | Giampaolo et al. | |
| 2012/0227059 A1* | 9/2012 | Fleming | G06F 9/541 |
| | | | 719/318 |
| 2012/0233554 A1 | 9/2012 | Vogell et al. | |
| 2012/0278127 A1 | 11/2012 | Kirakosyan et al. | |
| 2012/0303716 A1 | 11/2012 | Peters et al. | |
| 2012/0324121 A1 | 12/2012 | Carr et al. | |
| 2012/0331108 A1 | 12/2012 | Ferdowsi et al. | |
| 2013/0013560 A1 | 1/2013 | Goldberg et al. | |
| 2013/0054509 A1 | 2/2013 | Kass et al. | |
| 2013/0091205 A1 | 4/2013 | Kotler et al. | |
| 2013/0117376 A1* | 5/2013 | Filman | G06F 17/2288 |
| | | | 709/205 |
| 2013/0124638 A1 | 5/2013 | Barreto et al. | |
| 2013/0124967 A1 | 5/2013 | Hatfield et al. | |
| 2013/0138608 A1 | 5/2013 | Smith | |
| 2013/0151596 A1 | 6/2013 | Strong et al. | |
| 2013/0185651 A1 | 7/2013 | Wionzek et al. | |
| 2013/0191339 A1 | 7/2013 | Haden et al. | |
| 2013/0191451 A1* | 7/2013 | Tse | G06Q 10/101 |
| | | | 709/204 |
| 2013/0212250 A1 | 8/2013 | Kleppner et al. | |
| 2013/0254656 A1 | 9/2013 | Florian | |
| 2013/0275509 A1* | 10/2013 | Micucci | H04L 67/02 |
| | | | 709/204 |
| 2013/0297680 A1 | 11/2013 | Smith et al. | |
| 2014/0019626 A1 | 1/2014 | Hubler et al. | |
| 2014/0101310 A1 | 4/2014 | Savage et al. | |
| 2014/0156749 A1 | 6/2014 | Kanter et al. | |
| 2014/0172799 A1 | 6/2014 | Dorman | |
| 2014/0201289 A1 | 7/2014 | Wheeler et al. | |
| 2014/0223333 A1 | 8/2014 | Pegg et al. | |
| 2014/0237387 A1 | 8/2014 | Ryall et al. | |
| 2014/0244580 A1* | 8/2014 | Eisner | G06F 16/1824 |
| | | | 707/623 |
| 2014/0244583 A1 | 8/2014 | Wang et al. | |
| 2014/0279846 A1 | 9/2014 | Srinivasan et al. | |
| 2014/0280603 A1 | 9/2014 | Rideout et al. | |
| 2014/0330776 A1* | 11/2014 | Chen | G06F 17/30176 |
| | | | 707/610 |
| 2014/0372852 A1 | 12/2014 | Rothschiller et al. | |
| 2015/0012488 A1* | 1/2015 | van Rossum | G06F 17/30581 |
| | | | 707/611 |
| 2015/0082196 A1 | 3/2015 | Berger et al. | |
| 2015/0112927 A1 | 4/2015 | Lee et al. | |
| 2015/0142742 A1 | 5/2015 | Hong | |
| 2015/0149404 A1 | 5/2015 | Lock et al. | |
| 2015/0261411 A1 | 9/2015 | Snook et al. | |
| 2015/0278330 A1 | 10/2015 | Hawa et al. | |
| 2015/0281869 A1* | 10/2015 | Ramachandran | H04W 4/60 |
| | | | 455/418 |
| 2015/0286655 A1 | 10/2015 | von Haden et al. | |
| 2015/0288757 A1 | 10/2015 | Larabie-Belanger | |
| 2015/0288774 A1 | 10/2015 | Larabie-Belanger | |
| 2015/0288775 A1* | 10/2015 | Larabie-Belanger | |
| | | | H04L 67/24 |
| | | | 715/203 |
| 2016/0078237 A1* | 3/2016 | Tan | G06F 21/62 |
| | | | 726/28 |
| 2016/0105859 A1* | 4/2016 | Zhu | H04W 76/10 |
| | | | 370/350 |
| 2016/0119414 A1 | 4/2016 | Westaway et al. | |
| 2016/0259508 A1 | 9/2016 | Eccleston et al. | |
| 2016/0308940 A1* | 10/2016 | Procopio | G06F 17/30144 |
| 2017/0249328 A1* | 8/2017 | Liang | G06F 16/182 |
| 2018/0113862 A1* | 4/2018 | Glover | G06F 8/71 |

FOREIGN PATENT DOCUMENTS

| | | |
|---|---|---|
| JP | 2002-351730 A | 12/2002 |
| JP | 2010-211569 A | 9/2010 |
| JP | 2010-218432 A | 9/2010 |
| JP | 2011-526034 A | 9/2011 |
| JP | 2012-038210 A | 2/2012 |
| JP | 2012-519890 A | 8/2012 |
| JP | 2012-173780 A | 9/2012 |
| JP | 2013-161481 | 8/2013 |
| JP | 2013-196233 A | 9/2013 |
| JP | 2015-505627 A | 2/2015 |
| JP | 2015-513713 A | 5/2015 |
| KR | 10-2011-0124797 A | 11/2011 |
| WO | WO 2005/114383 A2 | 12/2005 |
| WO | WO 2010/100354 A1 | 9/2010 |

(56) References Cited

FOREIGN PATENT DOCUMENTS

| WO | WO 2013/109552 A1 | 7/2013 |
| WO | WO 2013/109557 A1 | 7/2013 |
| WO | WO 2015/139179 A1 | 9/2015 |

OTHER PUBLICATIONS

Lim, H. et al., "Ubi-Jector," CHI 2013: Changing Perspectives, Apr. 27, 2013-May 2, 2013, pp. 1695-1700.
PCT International Search Report and Written Opinion, PCT Application No. PCT/IB2015/052522, dated Jun. 18, 2015, 11 pages.
PCT International Search Report and Written Opinion, PCT Application No. PCT/IB2015/052519, dated Jun. 18, 2015, 9 pages.
Adahl, J., "Shared Resource for Collaborative Editing Over a Wireless Network," Master of Science Thesis, University of Gothenburg, Dec. 2010, 274 pages.
Terry, D.B. et al., "Managing Update Conflicts in Bayou, a Weakly Connected Replicated Storage System," Proceedings of the 15.sup.th ACM Symposium on Operating System Principles, Dec. 3-6, 1995, pp. 1-12.
PCT International Search Report and Written Opinion, PCT Application No. PCT/IB2015/052521, dated Sep. 24, 2015, 8 pages.
PCT International Search Report and Written Opinion, PCT Application No. PCT/IB2015/052523, dated Sep. 24, 2015, 7 pages.
European Examination Report, European Application No. 15736317.7, dated Oct. 30, 2017, 4 pages.
European Examination Report, European Application No. 15736316.9, dated Oct. 30, 2017, 5 pages.
Japanese Office Action, Japanese Application No. 2016-553452, dated Oct. 19, 2018, 11 pages (with concise explanation of relevance).
Australian Examination Report, Australian Application No. 2016381225, dated Feb. 28, 2019, 4 pages.
Japanese Office Action, Japanese Application No. 2016-553454, dated Nov. 16, 2018, 5 pages (with concise explanation of relevance).
Second Australian Office Action, IP Australia Patent Application No. 2016381225, dated May 10, 2019, 6 pages.
U.S. Office Action, U.S. Appl. No. 16/115,563, dated Oct. 3, 2019, eight pages.
Australian Office Action, IP Australia Patent Application No. 2015246019, dated Apr. 11, 2019, 4 pages.
Australian Office Action, IP Australia Patent Application No. 2015246018, dated Apr. 5, 2019, 6 pages.
Japanese Office Action, Japanese Application No. 2016-553439, dated Oct. 19, 2018, 7 pages (with concise explanation of relevance).
U.S. Office Action, U.S. Appl. No. 16/296,104, dated Sep. 6, 2019, 13 pages.
U.S. Office Action, U.S. Appl. No. 15/867,693, dated Sep. 17, 2019, 19 pages.
Examination Report No. 3 for Australian Application No. 2016381225, dated Sep. 2, 2019, four pages.
"C#—Is there Windows system event on active window changed?—Stack Overflow," Nov. 15, 2015, XP055573970, Retrieved from the Internet: URL:https://web.archive.org/web/20151115134250/https://stackoverflow.com/questions/440631/is-there-windows-system-event-on-active-window-changed [retrieved on Mar. 25, 2019].
European Office Action, European Patent Application No. 16767369.8, dated Apr. 1, 2019, 7 pages.
First Office Action, Japanese Patent Application No. JP2018517385, dated Mar. 18, 2019, 5 pages (with English concise explanation of relevance).
European Patent Office, Summons to Attend Oral Proceedings, EP Patent Application No. 15736316.9, dated Oct. 24, 2019, seven pages.
European Patent Office, Summons to Attend Oral Proceedings, EP Patent Application No. 15736317.7, dated Oct. 24, 2019, seven pages.
European Patent Office, Summons to Attend Oral Proceedings, EP Patent Application No. 16767369.8, dated Nov. 6, 2019, eight pages.
IP Australia, Notice of Acceptance for Patent Application, AU Patent Application No. 2015246018, dated Oct. 21, 2019, three pages.
IP Australia, Examination Report No. 4, AU Patent Application No. 2016381225, dated Nov. 28, 2019, five pages.
Japan Patent Office, Decision of Refusal, JP Patent Application No. 2018-517385, dated Nov. 11, 2019, six pages.
IP Australia, Notice of Acceptance for Patent Application, AU Patent Application No. 2016381225, dated Feb. 13, 2020, three pages.

* cited by examiner

NATIVE APPLICATION COLLABORATION

BACKGROUND

This disclosure relates generally to sharing information among devices, and particularly to interactions between native applications and shared content.

Content management systems permit devices to synchronize content items with the content management system and other devices. A device stores a local copy of content items. When content items are added, deleted, and edited on a device, these modifications are sent to the content management system for storage and synchronization with other devices. To interact with a content item, users typically execute a native application on the device to view and modify the content item. When users seek to add a content item to a content management system, the user typically must exit the native application, and users do not have a convenient way to add content items to a shared folder while also viewing the content item in the native application.

SUMMARY

Described embodiments enable a set of users of devices sharing content items via a content management system to simultaneously view and modify a single instance of the same content item within a native application. In various embodiments, graphical and textual information is provided to users on their respective devices indicating that a shared content item is being viewed or edited on one or more other devices. In addition, in various embodiments users can collaboratively edit the shared content item from two or more devices.

A device in accordance with various embodiments stores a local copy of a shared content item, which is maintained and synchronized between devices. The synchronization may be performed by a content management system or by the devices among themselves. The device includes a native application that can be used to access the content item, such as a word processor, media viewer, media editor, and so forth. The native application displays information relating to the content item in a user interface element, such as a window. The device also includes a client application that monitors interactions with the content item and communicates information about those interactions to other devices sharing the content item either directly or via the content management system. The client application generates interaction information including data describing the user's interactions with a content item. The client application also facilitates collaboration between two or more devices.

Interaction information includes interactions with the client application and interactions with the native application. Interaction information may be determined from presence information, which include programmatic events that occur in the native application. Presence events include opening a content item, editing a content item, saving a content item, renaming a content item, moving a content item, and deleting a content item. Presence events also include interactions with the user interface element of the native application, such as the user interface element gaining or losing focus. A focused user interface element is the user interface element that receives user inputs at the device. For example, if a user interface element has focus, presence information may be generated indicating that a user is "viewing" the content item via that user interface element. In one embodiment, the presence events are gathered by the client application, which is separate from the native application interacting with the content item. That is, in this embodiment the presence events are gathered by another application or process that is not integrated into the native application accessing the content item or the presence information.

The client application monitors events on the device to determine when a user is using a native application to interact with a content item. In one method of monitoring events, the client application registers with a process controlling a user interface element or the operating system to receive events related to the user interface element. The client application may monitor all such events, or only certain user interface elements associated with opening a content item. When a presence event occurs, the client application receives the presence event from the native application or from the operating system. The client application identifies a user interface element associated with the event and determines presence information associated with the event. The client application notifies the content management system for synchronized content items that the content item is being or has been interacted with, and sends the presence information to the content management system. The presence information (or other interaction information) may be sent directly to other devices.

The content management system receives the interaction information and may respond to the interaction information or send the interaction information to other devices based on the type of interaction information. Interaction information relating to messages is sent to other devices synchronized to the content item. Presence information is stored as a presence record, which in one embodiment indicates a content item, device, process, user interface element, and a type of presence (e.g., that the content item is open, viewed, being edited, or being collaboratively edited). A user presence may be determined that indicates a priority of interaction according to an ordering of interactions. In an example ordering, editing a content item has a higher priority than viewing the content item, which has a higher priority than opening the content item. The user presence describes a user's presence with respect to a content item and may be without reference to any particular device, process, or user interface element. The content management system may send the information to all devices that are synchronized with respect to the content item, or just to devices that are associated with an active presence record with respect to the content item. In one embodiment, devices register with the content management system to receive interaction information about a content item, which may specify a particular interaction to trigger notification. When the interaction occurs, the triggering interaction information is sent to devices associated with the notification.

When a monitoring event is received for a content item that is not synchronized to the content management system, a synchronization interface may be presented to the user. In the synchronization interface, the user may designate the content item to be synchronized to the content management system. When a request from the user is received to synchronize the content item, the client application determines a path for the content item in a shared folder and instructs the native application associated with the content item to save the content item to the shared folder. In this way, the native application may remain open with the content item during the saving and synchronizing process. When the content item is saved to a local shared folder, the client application synchronizes the content item to other devices or the content management system and during synchronization may update the synchronization interface to show the synchronization status of the content item. When the content item completes synchronization, the content item's status may be monitored normally, permitting sharing and other interactions with the content item via the content management system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
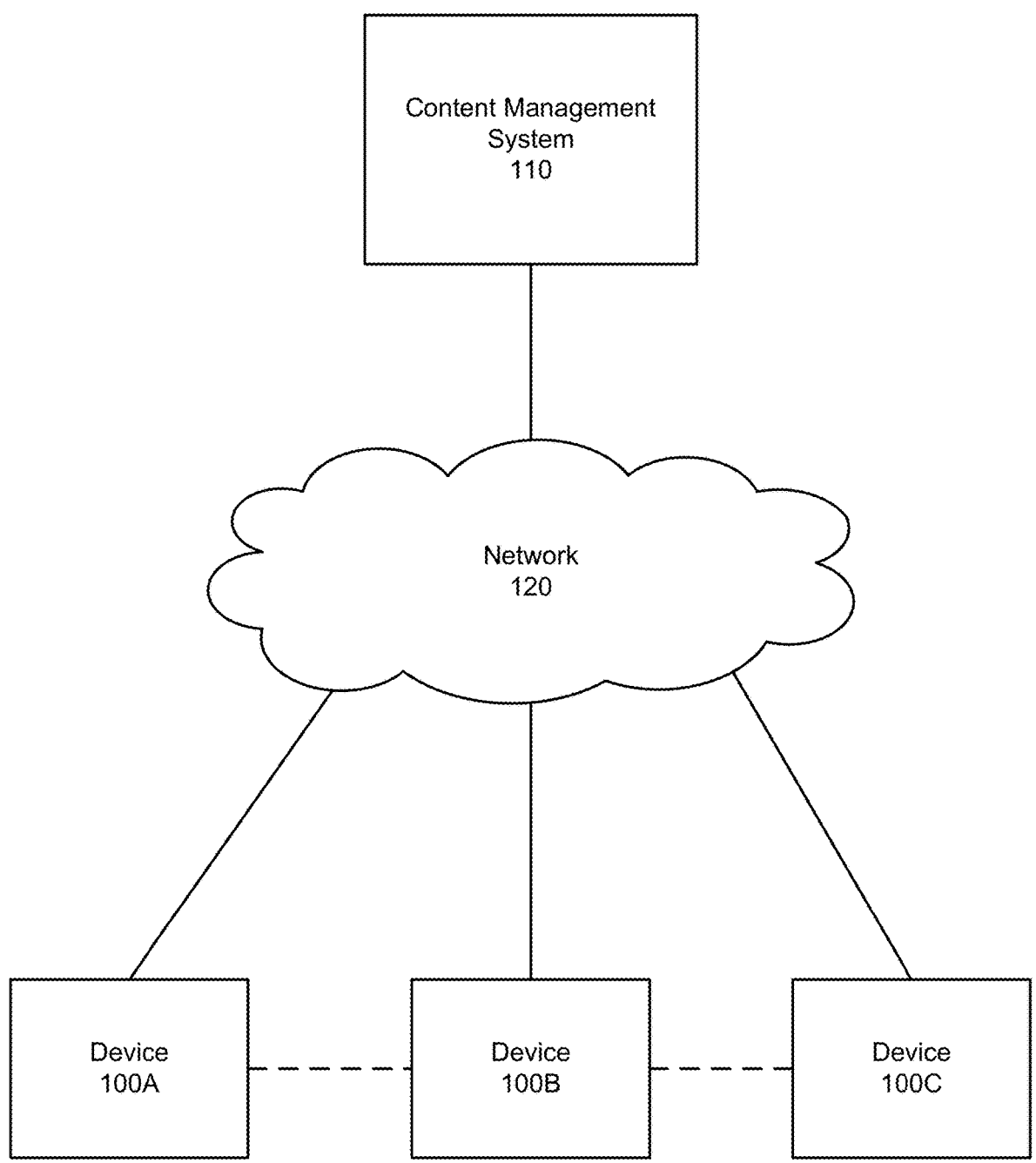
FIG. 1 shows an embodiment of an environment for content item synchronization including communication of interaction information and user collaboration

FIG. 1 shows an embodiment of an environment for content item synchronization including communication of interaction information and user collaboration. FIG. 1 includes devices 100A, 100B, 100C (referred to generally as device 100), content management system 110, and network 120. Three devices are shown only for purpose of illustration; in practice any number of devices may be present in the environment. Similarly, other modules or components described and illustrated throughout may include single or multiple instances as appropriate to the needs of the implementer and without loss of generality.

Device 100 may be any suitable computing device for locally storing and viewing content items and synchronizing the content items with content management system 110. Examples of devices include desktop and laptop computers, hand-held mobile devices, tablet computers, and other computing devices. The operation of device 100 in various embodiments is further described below.

Each device 100 communicates with content management system 110 through network 120. Network 120 is any suitable network and may include local networks, corporate networks, global networks, and any combination of these. In typical configurations, devices 100 communicate via a wired or wireless communication network to a local network service provider, and communicate with content management system 110 through the Internet. In certain configurations, devices 100A, 100B, and 100C communicate directly with one another without network 120 as indicated in FIG. 1 by dashed lines. For example, devices 100 may communicate via a wired or wireless connection, such as wirelessly via a Bluetooth connection or a wired connection via a Universal Serial Bus (USB).

Content management system 110 provides content sharing and synchronization services for users of devices 100. These services allow users to share content with users of other devices 100. In addition to content sharing, content management system 110 updates shared content responsive to changes and enables synchronized changes to content items across multiple devices 100. A user may synchronize content across multiple devices 100 owned by the user and associated with the user's account, and the user may share content that is synchronized with devices associated with other users' accounts. Content stored by content management system 110 can include any type of data, such as digital data, documents, media (e.g., images, photos, videos, audio, streaming content), data files and databases, source and object code, recordings, and any other type of data or file, collectively referred to here as "content items." Content items stored by content management system 110 may also be used to organize other content items, such as folders, tables, collections, albums, playlists, or in other database structures (e.g., object oriented, key/value etc.). In practice, various devices 100 may be synchronizing different groups of content items, based on user associations, permissions, content sharing permissions, and so forth. The operation of content management system 110 in various embodiments is further described below.

Figure 2:
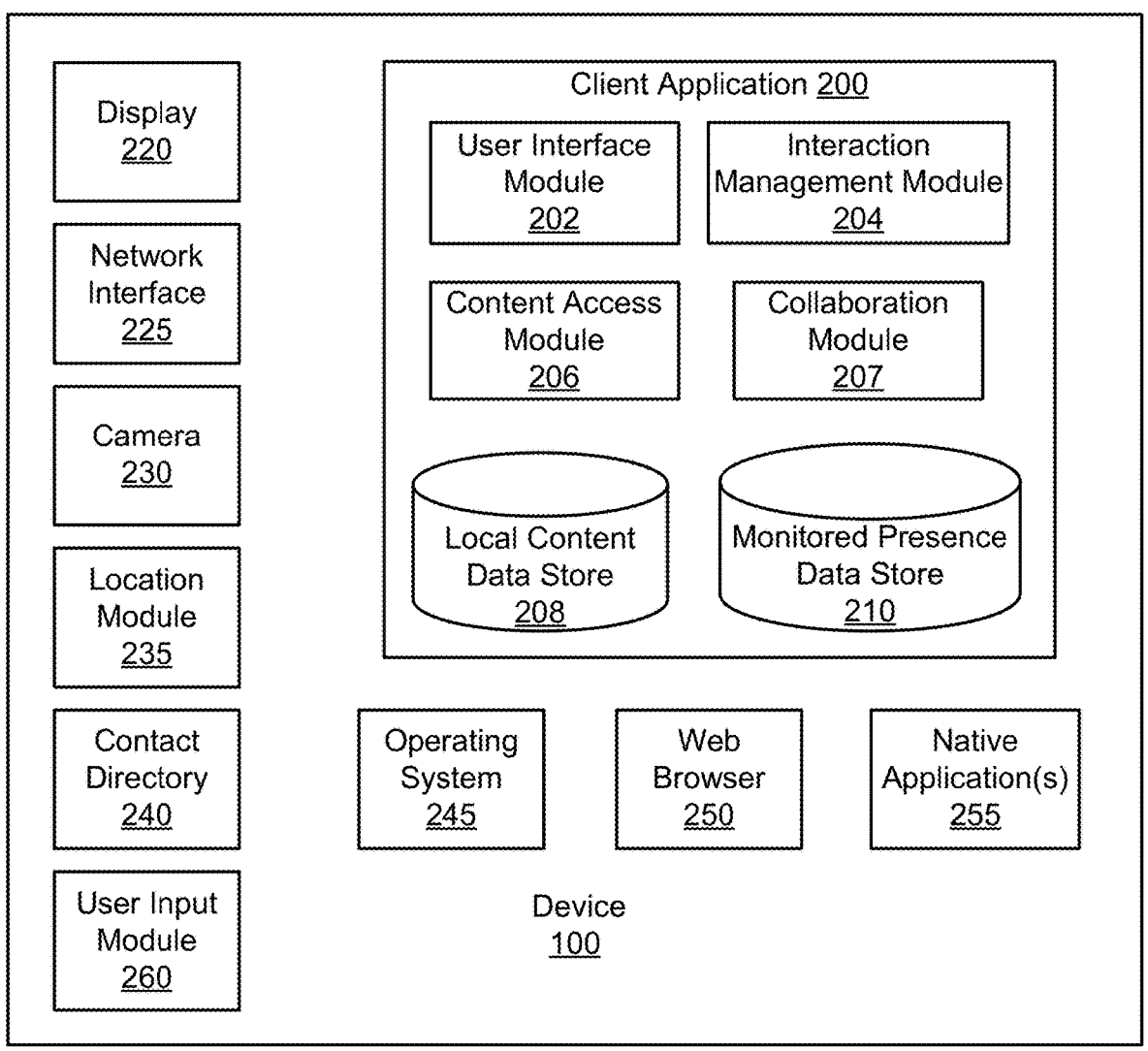
FIG. 2 shows various modules and components of a device in accordance with one embodiment.

FIG. 2 shows various modules and components of device 100 in accordance with one embodiment. Device 100 includes display 220 for providing information to the user, and in certain client devices 100 includes a touchscreen. Device 100 also includes network interface 225 for communicating with content management system 110 via network 120. Device 100 also includes a user input module 260, which receives user inputs from various user input devices, such as a keyboard, a mouse, a trackpad, or other device. Other conventional components of a client device 100 that are not material are not shown, for example one or more computer processors, local fixed memory (RAM and ROM), as well as optionally removable memory (e.g., SD-card), power sources, and audio-video outputs.

Software modules include operating system 245 and one or more native applications 255. Native applications 255 vary based on the client device, and may include various applications for creating, viewing, consuming, and modifying content stored on content management system 110, such as word processors, spreadsheets, database management systems, code editors, image and video editors, e-book readers, audio and video players, and the like. Operating system 245 on each device provides a local file management system and executes the various software modules such as content management system client application 200 and native application 255. A contact directory 240 stores information about the user's contacts, such as name, picture, telephone numbers, company, email addresses, physical address, website URLs, and the like. Further operation of native applications 255, operating system 245, and content management system client application 200 are described below.

In certain embodiments, device 100 includes additional components such as camera 230 and location module 235. Camera 230 may be used to capture images or video for upload to the online content management system 110. Location module 235 determines the location of device 100, using for example a global positioning satellite signal, cellular tower triangulation, or other methods. Location module 235 may be used by client application 200 to obtain location data and add the location data to metadata about a content item, such as an image captured by camera 230.

Client device 100 accesses content management system 110 in a variety of ways. Client application 200 can be a dedicated application or module that provides access to the services of content management system 110, providing both user access to shared files through a user interface, as well as programmatic access for other applications. Client device 100 may also access content management system 110 through web browser 250. As an alternative, client application 200 may integrate access to content management system 110 with the local file management system provided by operating system 245. When access to content management system 110 is integrated in the local file management system, a file organization scheme maintained at content management system 110 is represented as a local file structure by operating system 245 in conjunction with client application 200. Client application 200 may take various forms, such as a stand-alone application, an application plug-in, or a browser extension. Client application 200 includes user interface module 202, interaction management module 204, content access module 206, local content data store 208, monitored presence data store 210, and collaboration module 207.

In addition to handling other device tasks, operating system 245 displays information from applications executing on device 100 to a user via display 220, which may include one or more user interface elements. Such user interface elements may vary based on the particular device and configuration. User interface elements include windows on a desktop interface as well as interface elements on a mobile device. Examples of operating systems that employ user interface elements such as windows are Microsoft Windows 8 by Microsoft Corporation of Redmond, Wash., and OS X by Apple Inc. of Cupertino, Calif. In addition, operating system 245 manages control of multiple native applications 255, which may be executing simultaneously. The user interface elements may be layered, such that one layer overlaps another layer. In some operating systems and configurations, only a single user interface element is displayed at a given time. One user interface element is typically the active user interface element, meaning that it is the user interface element to which the operating system 245 routes user inputs, such as keyboard entry, cursor movement, touch sensors, touch gestures, and so forth. As understood by those of skill in the art, a window or other user interface element that is active at a particular time is often said to have focus. Users may select another user interface element to change the focus from one user interface element to another, and in some instances operating system 245 may change the focus without user input.

Typically, the user interface elements, e.g., windows, associated with native applications 255 are managed by operating system 245, which maintains an association between process identifiers of executing native applications 255 and user interface element identifiers of the user interface elements. For example, a particular application may be associated with process id "2587", which may be managing multiple user interface elements, with user interface element identifiers 4, 8, and 10. Each user interface element identifier may be separately associated with a particular content item opened by that native application 255, and multiple user interface element identifiers and process identifiers may be associated with the same content item.

Operating system 245 also handles and recognizes various events. Such events include a request from native applications 255 to close or open a content item, a request from native applications 255 to close a window or other user interface element, and requests to change a user interface element focus, among many others. As described below, these events may be used by interaction management module 204 to recognize a change in presence related to a content item.

Client application 200 identifies interactions that take place with respect to a content item, such as when a user opens, closes or edits the content item on the device. These interactions are identified by client application 200 to generate interaction information describing the interaction with the content item. Interaction information includes interactions with client application 200 and interactions with native application 255. Interaction information determined from actions of native application 255 is termed presence information. An application, such as client application 200 that determines interaction information and presence information is termed a presence application. Additional types of interaction information (in addition to presence information) include notes, messages, and notification requests related to the content item, which may be received by client application 200. Messages may include chat messages to other devices, messages indicating a user's intent to interact with (e.g., to edit) a content item, and messages indicating a user's intent to begin a collaboration session. Notification requests may include a request to be notified when another user's interaction information changes. Interaction information also includes metadata modifications, such as versioning notes, or requests for further information stored at content management system 110 about the content item, such as a request to view versioning information or prior content item versions. Further examples of interaction information is described below.

This interaction information is transmitted to other devices 100 that are synchronized with respect to the content item. The indication of intent may for example alert a second user of the content item on another device that the first user would like to edit the content item, or initiatite a collaborative editing session. Client application 200 identifies when users are using a native application 255 to interact with a content item, and also receives chat or intent information from a user. In various embodiments, device 100 identifies a user's presence in a content item (i.e. that the user has the content item open or is editing the content item) through interaction with operating system 245 as described further below.

Device 100 receives content items from content management system 110 and permits users to view, modify, and interact with the content items using various native applications 255 stored on the device 100. For example, device 100 may include a photo editing application that manipulates image content items, a word processing application that permits modification of text content items, or a computer-aided design (CAD) application that permits modification of drawing content items. As described further below, interaction information is determined by device 100 via user interactions applications and the interaction information is sent to other devices 100. In addition, when device 100 receives interaction information relating to other devices 100, the device 100 displays that interaction information.

In one embodiment, an application detecting interaction information relating to content items is distinct from the applications viewing or manipulating the content items. For example, the client application detecting interaction information is distinct from a photo editing application manipulating or displaying the image content items. In various embodiments, the application detecting interaction information is also responsible for synchronizing the content items with content management system 110. Since the application detecting presence information may be distinct from the applications about which presence is detected, presence may be monitored for many applications and content items at once and without requiring integration of the presence monitoring into each type of content item viewer. That is, no special presence monitoring add-on or application modification is required, for example, for each of a photo editing application, a word processing application, and a playlist editing application.

Figure 3A:
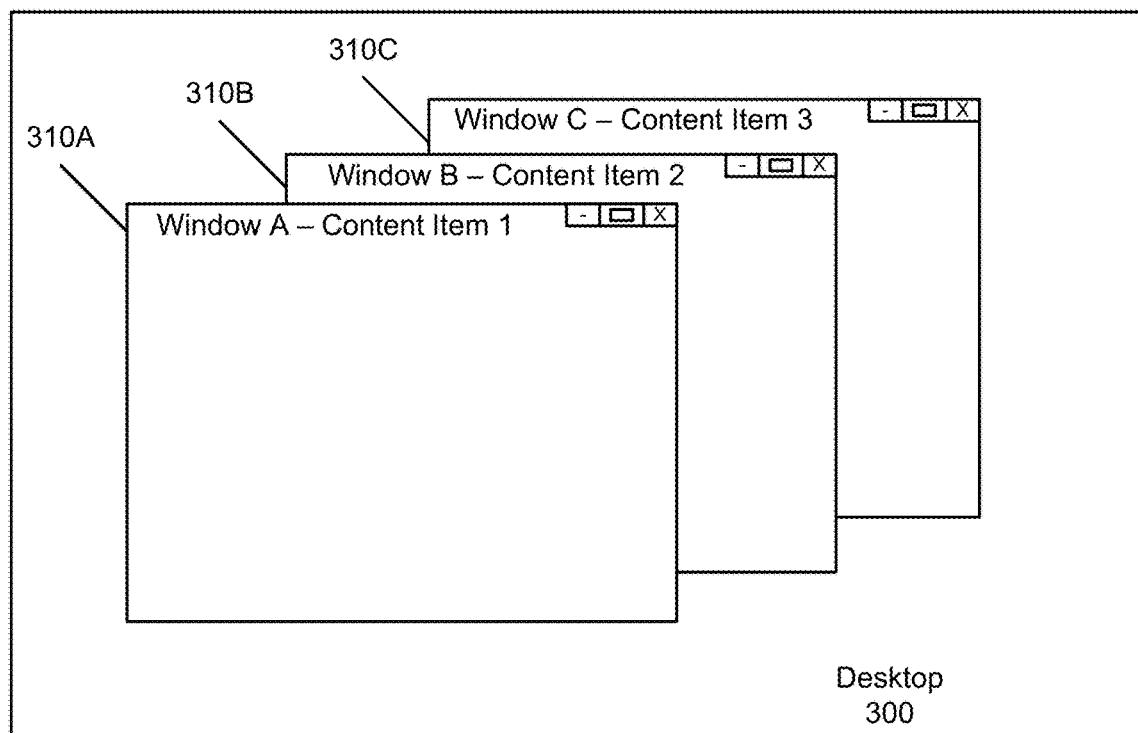
FIGS. 3A and 3B show a user interface element focus change on a desktop display of a device.
Figure 3B:
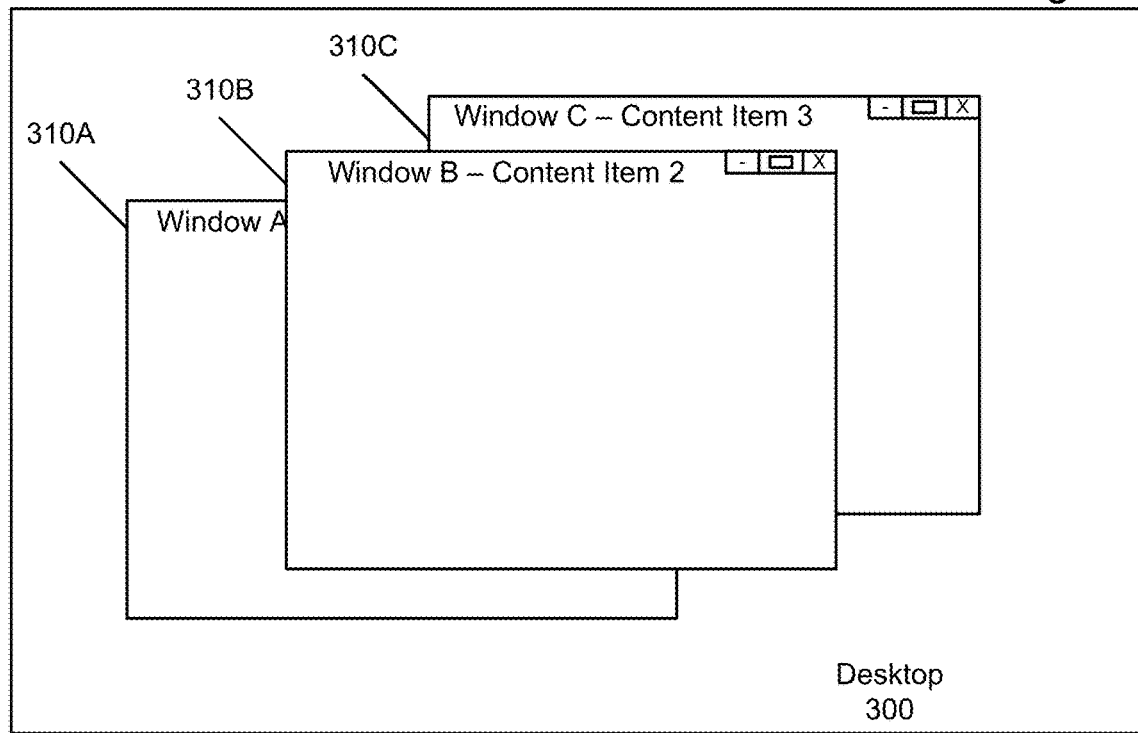

FIGS. 3A and 3B show an example of a user interface element focus change on desktop 300 shown on display 220 of device 100. In FIG. 3A, windows 310A, 310B, and 310C are displayed on desktop 300 and viewable by the user. In this embodiment, desktop 300 is a general container or frame maintained by operating system 245 that encloses user interface elements on display 220. In FIGS. 3A and 3B, the user interface elements are windows 310 in a desktop computing environment. In other configurations, such as a mobile device, or other display with limited area, only a single user interface element might be displayed at a time. As shown by FIG. 3A, window 310A is the active window, shown as the front window, partially obscuring windows 310B and 310C. In FIG. 3B, focus changed to window 310B, which is now the front window and the active window. The focus may change due to user interaction with window 310B, or due to a process requesting that its window become the active window. In certain operating systems and configurations, a user interface element has focus (e.g., is receiving user input) without being the front user interface element.

Referring again to FIG. 2, to open a content item, native application 255 requests the content item from operating system 245 and receives a handle to the content item from operating system 245 for the content item. In some cases, application 245 does not maintain the handle, and may load the content item data into memory and subsequently close the content item handle even if native application 255 continues to use data from the content item or if the user enters edits to the content item. Accordingly, open content item handles are often not a reliable way to determine whether an application is interacting with a particular content item. As such, in certain embodiments, further behaviors exhibited by the native applications 255 are used to determine whether an application is editing a content item.

Native applications 255 also perform various behaviors when a user modifies a content item, and prior to the user saving the content item. These behaviors vary based on the application and operating system 245. For example, some native applications 255 create a temporary content item with a filename that differs from the open content item, for example leading the temporary content item's filename with a tilde or other recognizable mark. In other examples, the native applications 255 changes the title of a user interface element associated with the content item, which may or may not be directly viewable by a user. In still further examples, native application 255 sets a flag indicating the content item has been modified. Native application 255 may also provide information regarding content item modification in response to a request from another application or the operating system. For example the Accessibility API in the OS X operating system as described above provides information regarding content items associated with a user interface element. Since an open content item handle may not reliably determine whether a content item is being edited by a native application 255, these behaviors are used by presence management module 204 to determine presence relating to editing or modifying a content item as described further below.

Native applications 255 may typically be executed on device 100 independently from one another, and may permit communication between the applications and other applications or processes executing on device 100. Native applications 255 typically provide information to processes using application programming interfaces (APIs), which permit applications to request information from the executing process. For example, native applications 255 may present an API permitting a request for user interface elements controlled by the application, or to indicate the title of a user interface element, or to request a path in a file system associated with a content item opened by the native application 255. Similarly, operating system 245 may provide similar APIs to requesting processes, such as requesting information about a process that controls a particular user interface element.

Client application 200 manages access to content management system 110. Client application 200 includes user interface module 202 that generates an interface to the content accessed by client application 200, as variously illustrated herein, and is one means for performing this function. The generated interface is provided to the user by display 220. Client application 200 may store content accessed from a content storage at content management system 110 in local content data store 208. While represented here as within client application 200, local content data store 208 may be stored with other data for client device 100 in non-volatile storage. When local content data store 208 is stored this way, the content is available to the user and other applications or modules, such as native application 255, when client application 200 is not in communication with content management system 110. Content access module 206 manages updates to local content data store 208 and uses synchronization logic to communicate with content management system 110 to synchronize content modified by client device 100 with content maintained on content management system 110. One example of such synchronization is provided in U.S. patent application Ser. No. 14/040,584, filed Sept. 27, 2013 and is hereby incorporated by reference in its entirety. Client application 200 may take various forms, such as a stand-alone application, an application plug-in, or a browser extension.

Content management system 110 may provide additional data for synchronizing content items, such as information designating that a content item has been deleted, or that the device 100 may be viewing or editing an outdated version of a content item.

Interaction management module 204 obtains and manages interaction information relating to a user's synchronized content items. As described above, the interaction management module 204 is typically a distinct module from the native applications 255 being monitored by interaction management module 204 for presence information and executes as a separate process. Interaction management module 204 sends interaction information determined about a content item synchronized to device 100 to content management system 110. Interaction management module 204 also receives interaction information relating to other users from content management system 110 for display to the user. As described further below, in one embodiment the interaction management module 204 displays presence information relating to other users by attaching a presence indicator to a user interface element associated with a synchronized content item. Further interaction information is also displayed with the presence indicator.

To determine many types of interaction information, interaction management module 204 receives interaction information through user interface elements, as further described below. To determine presence information related to a synchronized content item, interaction management module 204 monitors user interface elements associated with native applications 255. Interaction management module 204 can monitor all user interface elements, or alternatively monitor just certain user interface elements after the user interface element is associated with a content item. Monitored presence data store 210 includes information maintained by interaction management module 204 to indicate that particular user interface elements are monitored to determine actions relating to a synchronized content item.

While shown here as a part of client application 200, in various implementations the content access module 206 and interaction management module 204 are separated into distinct modules for performing their respective functions. Similarly, various modules and data stores are described separately throughout this disclosure for convenience and in various implementations may be combined or further separated into separate components as desired.

Figure 4:
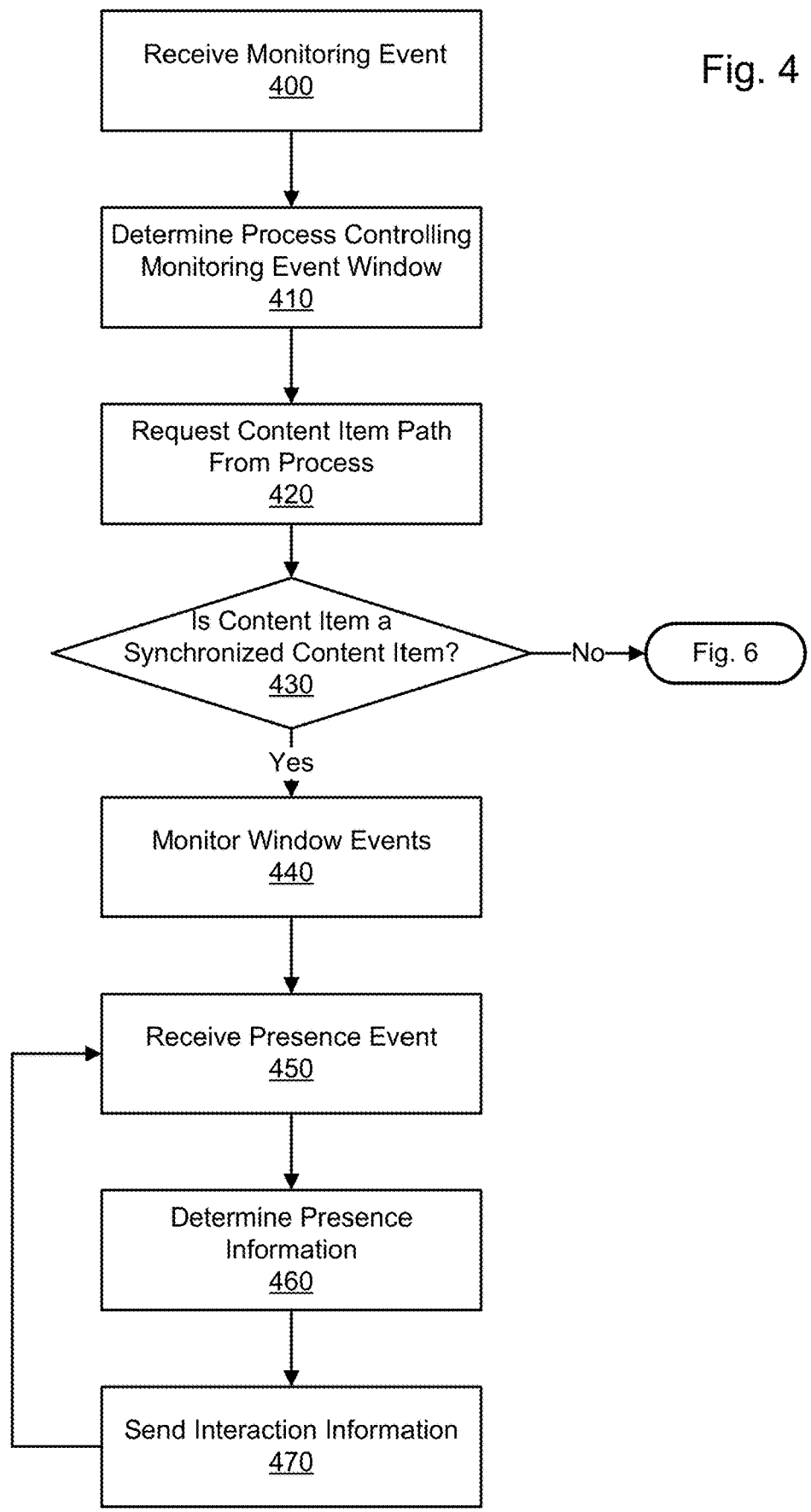
FIG. 4 shows an example process for determining presence information associated with a content item according to one embodiment.

FIG. 4 shows an example process for determining presence information associated with a content item according to one embodiment. This process is typically performed by interaction management module 204. Where the user interface elements are monitored only after being associated with a content item, interaction management module 204 uses events indicating that a content item is being opened by an application or user interface element to determine whether to monitor a user interface element. This is one example of an event that may associate a content item with a user interface element to initiate monitoring of the user interface element, termed a monitoring event. In other embodiments, a selection of user interface elements to monitor is determined in another way, or all user interface elements are monitored, in which case the interaction management module 204 may not use monitoring events. In another embodiment, the monitoring event includes a process saving a content item.

If enabled by operating system 245, the interaction management module 204 may register with operating system 245 to receive monitoring events for specific applications. In these embodiments, operating system 245 notifies interaction management module 204 when a request to open or save a content item is received by operating system 245. In this embodiment, interaction management module 204 receives a monitoring event 400 that indicates a window or other user interface element is interacting with a content item, which may be a synchronized content item (i.e., the process is interacting with the content item in a particular user interface element). The monitoring event designates at least a user interface element that triggered the monitoring event. In other embodiments, interaction management module 204 monitors events associated with user interface elements from time-to-time (e.g., five minute intervals) and queries whether the user interface elements are associated with any open content items. According to operating system 245 and native application 255 configuration, this query may be directed to operating system 245 or native application 255. When a user interface element is associated with a newly opened content item, that newly opened content item is treated as a monitoring event to determine whether the newly opened content item is a content item synchronized with content management system 110 and that presence information should be determined for the newly opened content item.

When the monitoring event is received, interaction management module 204 determines 410 which process is responsible for the user interface element associated with the monitoring event. Interaction management module 204 typically determines the process by requesting the process ID associated with the user interface element from operating system 245. In some embodiments, the interaction management module 204 identifies a process by requesting an identification of the process from the user interface element itself.

To confirm that the process and user interface element are correctly associated with one another and that the user interface element is still active, interaction management module 204 may also request from the process the identity of the currently active user interface element. The interaction management module 204 confirms that the currently active user interface element received from the process matches the user interface element associated with the monitoring event.

Using the process identifier, interaction management module 204 requests 420 any open content item from the process to obtain an associated directory path for the content item. The interaction management module 204 may designate the user interface element associated with the monitoring event with the request for the open content item's path. The interaction management module 204 requests the open item from the process or operating system using an interface available to the process or operating system. As one example, in the OS X operating system, the accessibility API may be used to access information relating to a content item and content item path for a user interface element, as known in the art. Using the content item path provided by the process, the interaction management module 204 determines whether the opened content item path corresponds to any synchronized content items. If so, interaction management module 204 determines that the content item accessed by the process is a content item synchronized to content management system 110 and associates that process and user interface element with the content item. In other embodiments, other methods may be used to determine whether a content item accessed by the process is a synchronized content item.

If the content item is synchronized 430 to content management system 110, interaction management module 204 stores information relating to the content item, process, and user interface element, to monitor 440 the user interface element for events. When the content item associated with the monitoring event is not synchronized, the process may continue by displaying a synchronization interface to a user as further detailed in FIG. 6 and shown in FIGS. 7A-7D. This monitoring information is stored in monitored presence data store 210. To monitor and subsequently receive presence events related to the user interface element, interaction management module 204 registers to receive events associated with the user interface element. The registration process by the interaction management module 204 varies according to the configuration of device 100. Typically the interaction management module 204 registers a request to receive presence events from operating system 245 or from the applicable process or user interface element. While the monitoring events determined whether a user interface element or process interacting with a synchronized content item, presence events are events that may indicate a change in state of a user's presence relating to the user interface element or process associated with a content item. Example presence events include a change in focus of a user interface element, closing a user interface element, closing a content item, opening a content item, and so forth based on the types of presence recognized by the interaction management module 204. In various configurations, the presence events used by interaction management module 204 depend on the events operating system 245 and native application 255 make available for receipt by interaction management module 204.

The presence events are used to determine presence information associated with the content item to which the presence event relates. For example, a presence event indicating that a user interface element that is associated with a content item has the focus will indicate that the user is viewing the content item, and hence the presence information for that content item indicates that state. Likewise, a presence event indicating that a user interface element unrelated to a content item has gained focus indicates that the content item associated with a previously focused user interface element has lost focus, and thus indicates that user is no longer be viewing the content item. Thus, presence information provides a level of semantic interpretation of the underlying presence event itself.

In addition to receiving presence events that the interaction management module 204 registered for, presence events may also be initiated by interaction management module 204 to confirm that presence information has not changed for a monitored user interface element. These presence events may be initiated if a threshold amount of time passed since the last presence event for a particular user interface element or process, or at particular intervals, e.g., every five minutes.

In addition to registering for events, interaction management module 204 may receive interaction events in other ways. In one embodiment, users may expressly indicate interaction information through a user interface element. The user interface element can be configured to allow the user to indicate, for example, that a user intends to revise a content item, to indicate that intent to other users who are editing or viewing the content item, for example by selection of a menu item or icon that represents the particular intent. The user interface element can also be configured to allow a user to indicate other intentions of the user, such as a user's intention to no longer view a content item, or to expressly indicate that a user is not or will not be present for a content item. Other users may use such "not present" intention to know that the content item is free for editing. User input interaction events may also include messages or chat features to be disseminated to other users associated with the content item, for example, to transmit a message to other users currently viewing the content item on other devices.

When a presence event is received 450, interaction management module 204 determines whether any presence information has changed since the last presence event related to a monitored user interface element. For user-initiated interaction information, the interaction information may be the information provided by the user, for example the user's selection of a user interface element indicating that the user intends to modify a content item, or a user's chat message. For presence events, the interaction management module 204 queries the monitored process to determine the status of the monitored user interface element. In particular, the interaction management module 204 queries the process to determine if the monitored user interface element is the active user interface element. When the monitored user interface element is the active user interface element, the content item is being viewed by the user.

In some embodiments, in addition to detecting user presence with respect to a content item, interaction management module 204 also determines whether the content item is being or has been modified by the user. This further aspect enables presence information to be reported more granularly, for example with an indication that a user has a presence with respect to the content item as an editor rather than as a viewer. As the particular actions performed by applications when a content item is being modified may vary as described above, detecting one of these actions by interaction management module 204 indicates that the process has edited the content item. For example, according to the type of actions expected by the process when the content item is edited, interaction management module 204 may query the process to determine if the process indicates the content item has been flagged as modified, if the title information of the user interface element has changed, if a temporary file has been saved or cached, or any other data that suggests the content item has been modified. Interaction management module 204 may also query the operating system to determine if a content item has been saved that matches a temporary content item format, for example a content item with a filename similar to the content item, but with a tilde or other specialized variation of the filename. Such modifications indicate that the presence information associated with the content item should reflect that the user is editing the content item.

After determining 460 the presence information, any new presence information for a user interface element may be stored as monitored presence data store 250. This presence information in one embodiment is stored on a user interface element-by-user interface element basis, such that multiple user interface elements by one process may be associated with the same content item, and have presence information individually managed. In one embodiment, presence information may change based on the current presence status. For example, when the presence information for a content item reflects that the content item is being edited, in one embodiment the presence for the content item in a user interface element is not changed when a user changes focus to another user interface element. Instead, the edited status is maintained with respect to that user interface element until a presence event indicates the user interface element is closed. In another embodiment, since editing has the potential to introduce modifications to the content item, in one embodiment the presence information for an edited document is not changed until the interaction management module 204 receives a notification that modifications to the content item are either committed or the modifications are discarded.

A content item with presence information indicating it is being viewed may have that status change when the user interface element loses focus, or within a threshold period of time of losing focus. This may be the case even if the user interface element associated with the content item is still open. In one embodiment, "viewed" presence information indicates whether a content item is associated with an active user interface element. In one embodiment, "viewed" presence information is retained until the user interface element is not active (or has lost focus) for longer than a threshold amount of time. In one embodiment, the content item is considered "viewed" while the content item is open by an application.

When there is a change to the interaction information, interaction management module 204 sends the interaction information to content management system 110. In one embodiment, the sent presence information includes an identifier of the content item, the process id, the user interface element id, and the presence status.

Figure 5A:
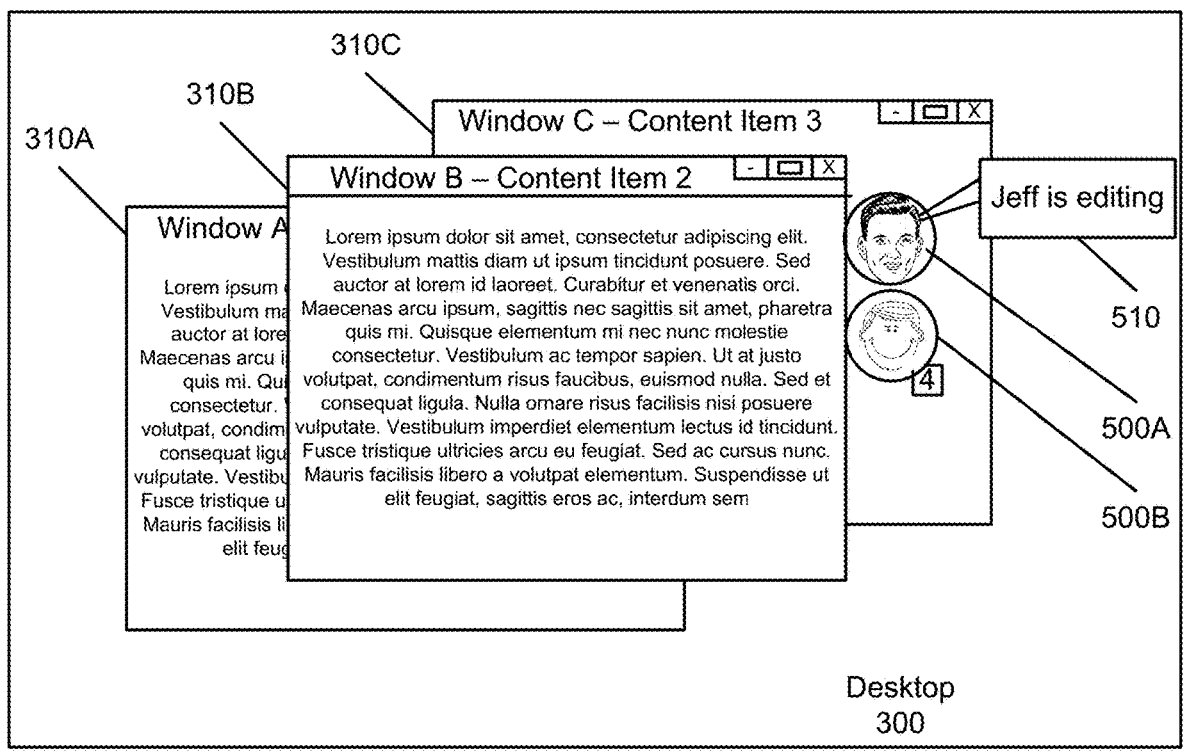
FIGS. 5A-5D show example user interfaces displaying interaction information.

FIGS. 5A-5D show example user interfaces displaying interaction information. Various user interface elements are similar to those depicted in FIGS. 3A and 3B. In FIG. 5A, the example user interface displays presence information. To display presence information, interaction management module 204 provides presence indicator(s) 500 along a boundary or border of the window associated with the content item. In this example, interaction management module 204 receives presence information indicating that user Jeff is editing content item 2 and four users are viewing content item 2. Interaction management module 204 displays presence indicator 500A to indicate that Jeff is editing the document and presence indicator 500B indicating users are viewing the document. In one embodiment, presence indicator 500 displays an icon or picture of a user associated with the presence indicator. The icon or picture may be obtained by interaction management module 204 from contact directory 240, or may be received from content management system 110. The individual user displayed by the presence indicator may vary depending on the embodiment, and may display, for example, the first user having a particular presence (e.g., the first viewer) or the user who most recently opened the content item.

Presence indicator 500 is displayed along with the window associated with the content item, and in one embodiment interaction management module 204 tracks the location of the window and displays presence indicator 500 adjacent to or near the window, for example alongside a border or boundary of the window. A supplemental presence indicator 510 may appear when a user hovers over presence indicator 500 to provide further information or interfaces for the user. In the example shown in FIG. 5A, supplemental presence indicator 510 describes presence indicator 500A, specifically that Jeff is associated with a presence of editing content item 2. Supplemental presence indicator 510 may also appear when a presence changes, to indicate a new user is viewing or editing the document, for example.

The presence indicator 500 and supplemental presence indicator 510 may be located on any convenient area of display 220. In one embodiment the presence indicator is displayed proximal the associated user interface element of the content item so as to visually indicate to the user the relationship between the presence indicator and the specific content item. In addition, the display of the presence indicator along a boundary or border of the window increases the likelihood that the user will notice the presence indicator. In one embodiment, the presence indicators 500 are displayed on or alongside a vertical edge of the window containing the content item (e.g., right edge as shown FIG. 5A).

Alternatively, the presence indicator may be shown in a separate area of the display, such as a taskbar, or tray icon or may be a separate user interface element that does not interact with the user interface element of the content item. Though shown here as a single presence indicator 500 for each type of presence (editing or viewing), any number of presence indicators 500 may be shown related to the content item. For example, a circular indicator may include a count of users viewing the content item and another circular indicator may include a count of users editing the content item. Alternatively, where multiple presence indicators 500 are to be displayed, they may be ordered from top to bottom, where the ordering can be most recent to least recent, or highest priority to lowest priority, or a combination thereof (e.g., ordered by priority, and for presence indicators of the same priority, ordered by recency). The presence indicator, as shown, may also indicate an icon or picture associated with the other user. The indicators may also be color-coded to indicate the risk that a user will affect edits by other users. For example, the presence indicator may be red (or the presence indicator may turn red) when another user is editing, indicating to the user to coordinate any desired modifications with that user's changes. Likewise, the editing indicator may be yellow when other users are viewing the content item, and green when the current user is the only user viewing the content item.

Figure 5B:
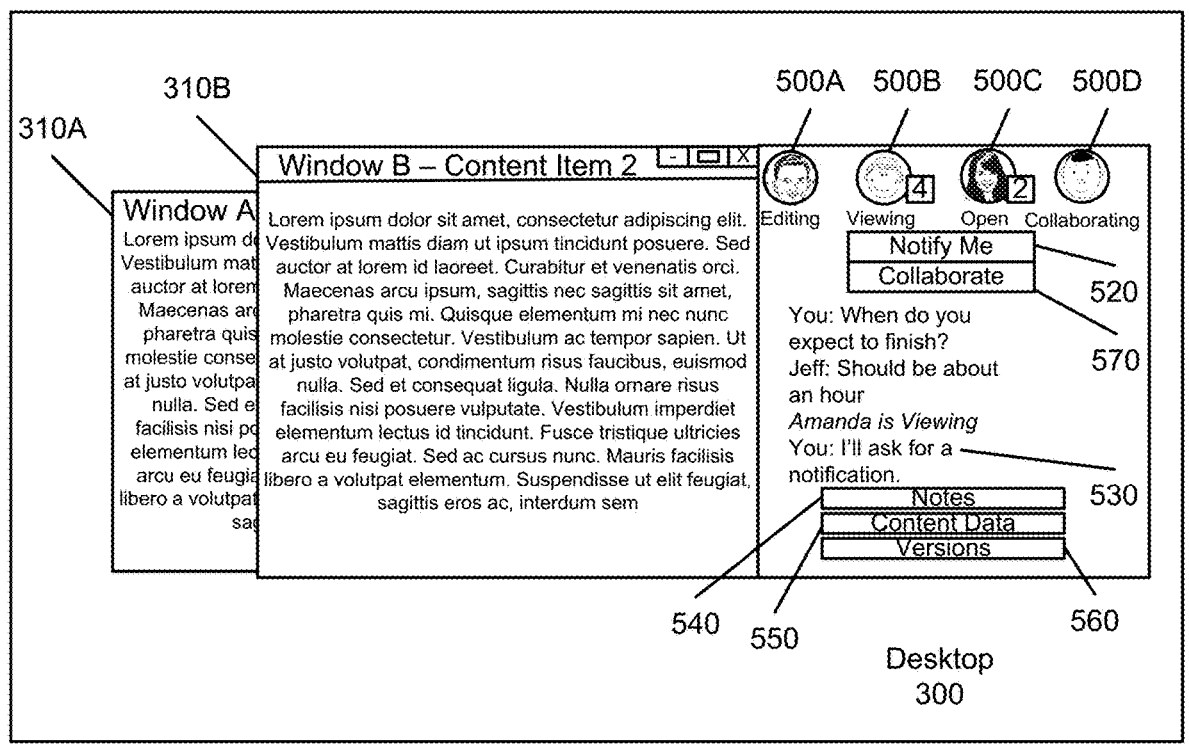

FIG. 5B shows a user interface through which a user may enter interaction information to the interaction management module 204. This interface includes presence indicators 500, in addition to further user interface elements. This interface may be presented in lieu of the example of FIG. 5A, or may be presented as a supplemental presence indicator providing additional data regarding the content item.

The user interface of FIG. 5B provides notification element 520, permitting a user to indicate the user's desire to be notified when a presence change occurs related to another user. Upon selecting notification element 520, the user may further select specific notification options, for example to be notified when a particular user's presence changes (e.g., Jeff is no longer editing), that all users have stopped a particular presence (e.g., no one is editing), or that no users have an active presence (e.g., that no one else is accessing content item 2). The user's notification preference is sent to content management system 110 or the applicable users to request notification when the requested presence changes.

The interface also provides collaboration element 570, permitting a user to initiate a collaboration session with other users who have the content item open. Upon selecting collaboration element 570, the user may further select specific collaboration options. For example, choosing which users to include in a collaboration session and choosing whether to collaborate with editing control.

This interface also provides a chat interface for users to communicate with other users present in the content item. The chat interface permits users to enter and receive messages to other users. Presence changes may also be indicated in the chat window, for example that Amanda is now viewing the content item. The chat window may permit users to specifically discuss information relating to that content item, such as when a user expects to finish editing the item. These chat messages are received by interaction management module 204 as interaction information and sent to other clients synchronized to the content item. This permits users to chat directly about a content item, even if the native application provides no chat functionality.

Notes user interface 540 permits a user to retrieve and enter notes stored in association with the content item. When notes interface 540 is selected, interaction management module 204 requests any notes or other persistent information from content management system 110 relating to the content item and displays any such notes to the user along with an interface for entering additional notes to be sent to other synchronized devices and content management system 110. Like the chat window, this permits additional notes to be entered for a content item and application providing the user interface which may not natively provide for any note functionality. The notes element 540 may also be used when no other users are present within the content item and may be used to leave messages for other users about a content item.

Content data element 550 permits a user to request additional data about the content item, such as any related metadata, user permissions, and so forth. This permits a user to request details of the content item from the content management system directly from an interface near the user interface element associated with the content item.

Similarly, versions element 560 indicates a request for version information. Interaction management module 204 transmits the request for version information to content management system 110 as interaction information related to the content item. In response, content management system 110 identifies relevant version information for the content item. In one embodiment, a prior version is compared side-by-side with the version of the content item displayed in the user interface element. In another embodiment, the prior version is compared in-line in the user interface element.

Figure 5C:
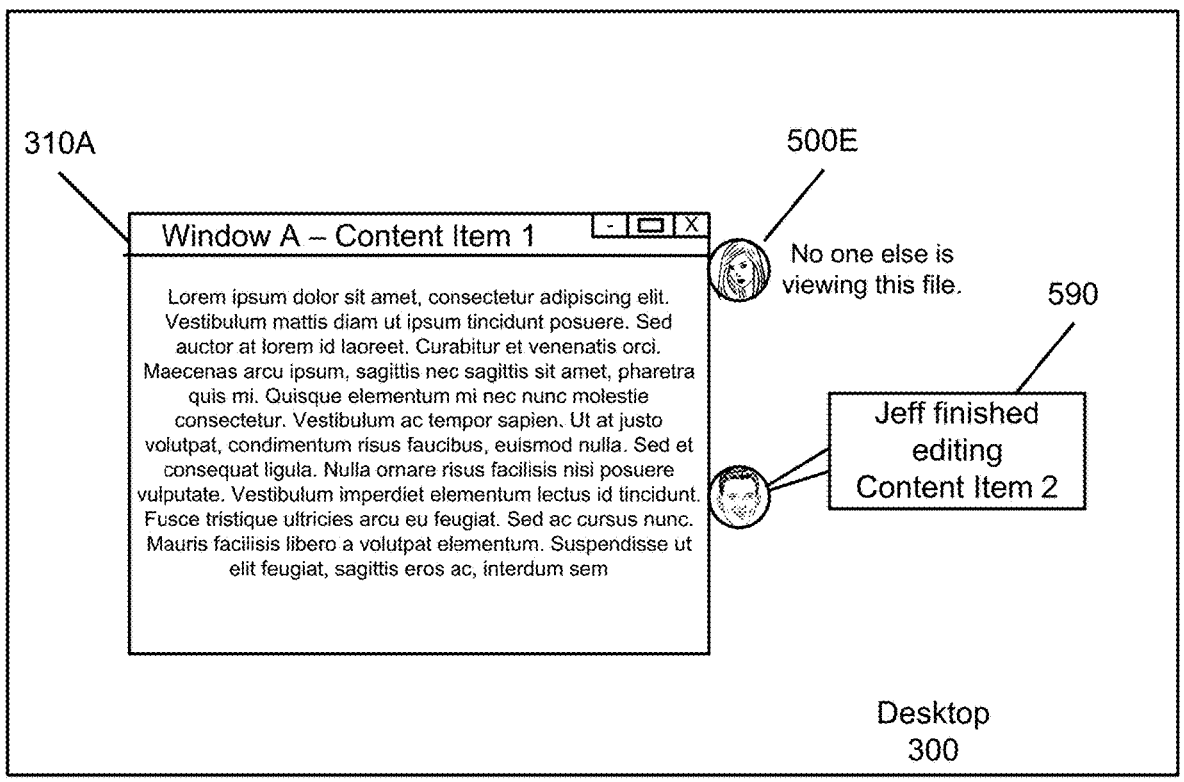

FIG. 5C shows a user interface in which a user is notified about a change in presence related to another content item. In this case, a user had previously selected to be notified when user Jeff finished editing content item 2, using notification element 520. After requesting notification, the user proceeded to close window 310B relating to content item 2, and is presently viewing content item 1. In this embodiment, presence indicator 500E indicates that the user is the only user with presence relating to this content item. This may be espressly indicated ("No one else is viewing this file") as shown, or may be provided if a user interacts with presence indicator 500E. Interaction management module 204 receives a notification that Jeff has finished editing content item 2. The notification 590 is displayed to the user. This notification is provided though the user may be interacting with another application or another content item than the content item to which the notification relates.

Figure 5D:
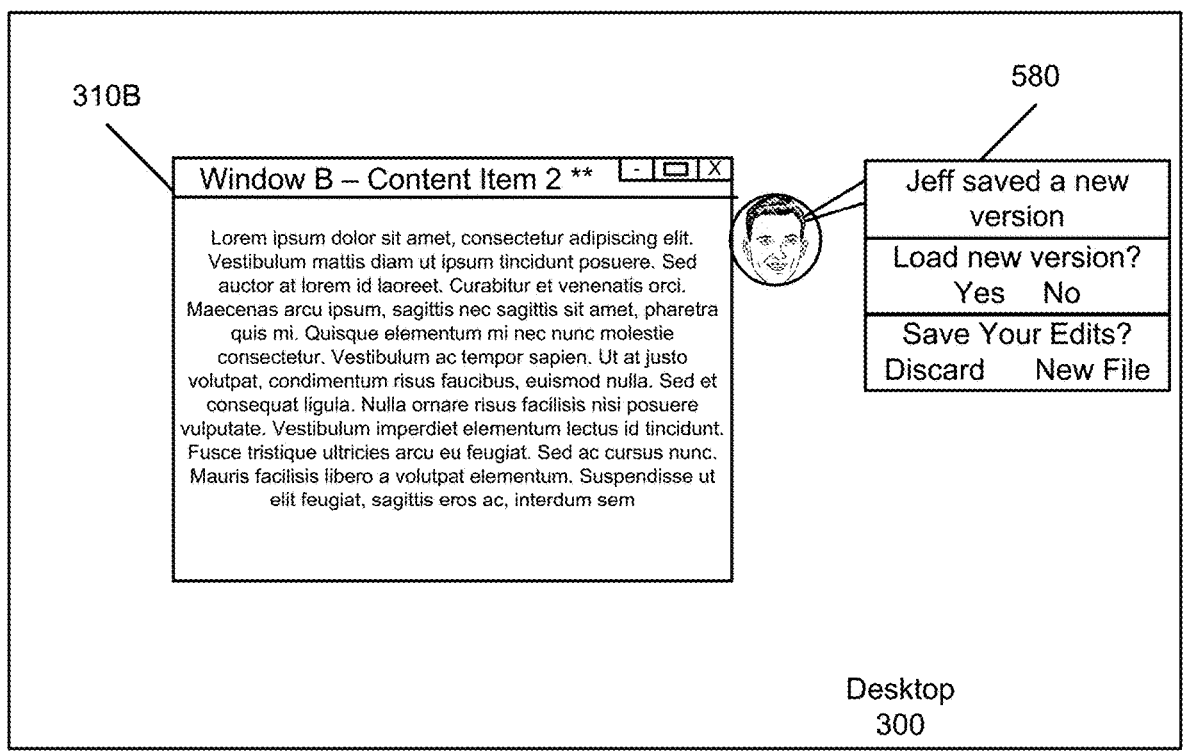

FIG. 5D shows a user interface in which a user receives a notification that a content item has been modified. In this example, a new version of content item 2 viewed by the user has been saved by another user, Jeff. Interaction management module 204 receives a message from content management system 110 indicating that content item 2 has been modified and a new version is available. Typically, the user's edits may be lost if the user attempted to synchronize the user's edits to content management system 110 because the user's edits would be out of date with the version maintained by content management system 110. Using the presence information indicating the user is editing the content item, the user can be provided choices to assist in incorporating any edits from Jeff into the user's edits. A version notification 580 is presented to the user, along with choices to make in response to the new version. In this example, the user may elect to load the new version, discard the user's edits, or save the user's edits as a new file. The particular choices available to a user may be provided by content management system 110 based on content management system 110's record of the device's presence 100, as further described below. In another embodiment, interaction management module 204 determines options for display to the user.

In embodiments where interaction management module 204 is a separate application from the native application 255 of window 310B, presence indicators 500 are provided by interaction management module 204. Thus, interaction management module 204 monitors presence information associated with the application, and displays presence information relating to other users for a content item associated with the application. When other windows are activated, the same interaction management module 204 displays presence information relating to the activated window.

To display the presence indicator(s), interaction management module 204 receives the presence information for other devices, typically from the content management system 110. Interaction management module 204 determines that a synchronized content item is in use by a window or process, and that the window is being displayed to the user. For example, interaction management module 204 may receive a presence event from the window or process being monitored as described above. When the presence event indicates that the window has the focus, interaction management module 204 adds the presence indicator to the display. Interaction management module 204 in one embodiment also tracks movement of the window in the desktop and moves the presence indicators to maintain the location of the presence indicators relative to the window.

In one embodiment, to add the presence indicator to the display, interaction management module 204 determines the location of the focused window and its boundaries, and adds the presence indicator adjacent to the window boundary. When interaction management module 204 identifies that the focused window has changed, the presence indicator for that content item may also be removed until that window is focused again.

Referring again to FIG. 5B, in one embodiment, collaboration element 570 is displayed in association with a content item that is open for viewing or editing in native applications on at least two devices. A viewing or editing user may initiate collaboration via collaboration element 570. During collaboration one device assumes the role of primary device, and other device(s) are secondary devices. The primary device is the device having the instance of the content item in which collaboration occurs. Secondary devices therefore provide viewing and editing functionality with respect to the instance of the content item located on the primary device. There may be multiple secondary devices for a given collaboration session, but only one primary device.

Prior to collaboration, an instance of the content item may be open for viewing or editing on what will become the secondary device. In one embodiment, collaboration element 570 prompts one of the users, e.g., the requesting user, to choose which device will be the primary device for the collaboration session. In another embodiment, the primary device is chosen by collaboration module 207. For example, if one user has the content item open for editing and another has the item open for viewing, collaboration module 207 designates the device on which the item is being edited as primary.

Figure 6:
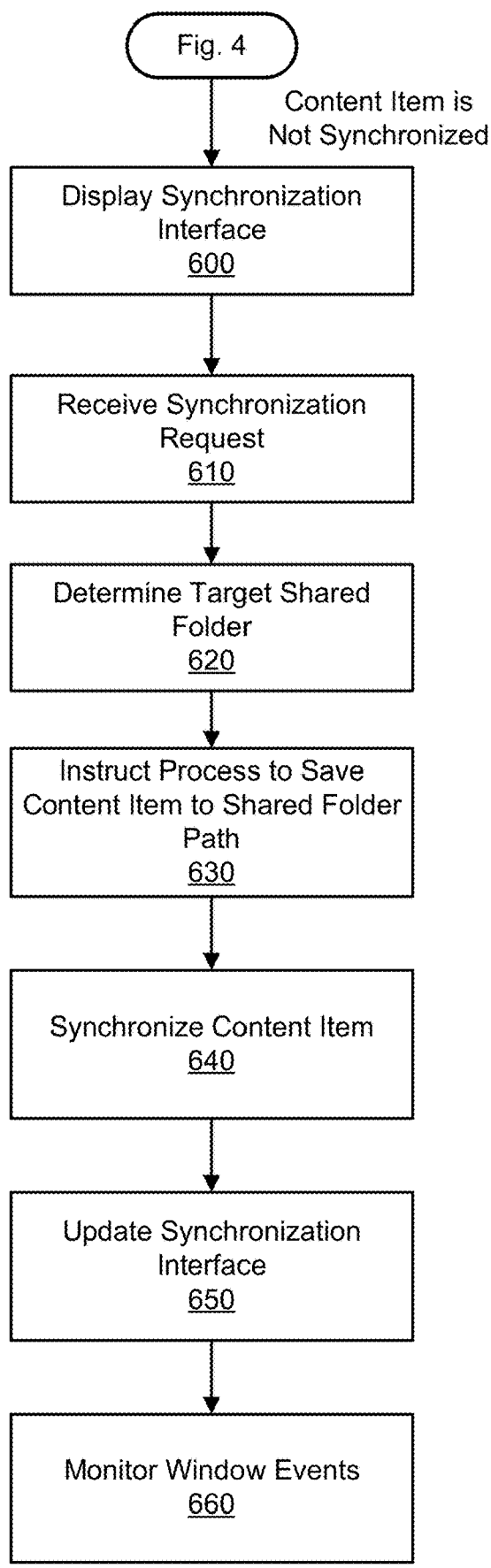
FIG. 6 shows an example process for adding a content item to a shared folder.

FIG. 6 shows an example process for adding a content item to a shared folder. As discussed with respect to FIG. 4, FIG. 6 continues a process when a monitoring event is received for a content item that is not synchronized with the content management system. The process shown in FIG. 6 may be performed by client application 200. In this example, the monitoring event may be a content item opened or saved by a process associated with a window or other user interface element of a native application. In some examples, the synchronization interface is displayed for any content item of a native application that is not synchronized with a shared folder. In other examples, the synchronization interface is displayed after a threshold amount of time that the content item is saved, such as five or ten seconds after saving. A synchronization interface is displayed 600 to adjacent to or near the window of the native application, and may overlay a portion of the window. Example user interfaces for the synchronization interface are shown in FIGS. 7A-7D. The synchronization interface permits a user to indicate a request to add the content item to a shared folder synchronized with content management system 110 or one or more other client devices 100. Next the user may provide a request to add the content item to the shared folder, which is received 610 by client application 200.

To save the content item to a shared folder, client application 200 determines 620 a target shared folder for the content item. That is, the client application determines the location to save the content item, such as a specific shared folder or other location or collection in local content data store 208 that is synchronized with content management system 100 or other client devices 110. In one embodiment, the synchronization interface displays a file browser interface for a user to select a location in local content data store 208 for storing the content item. Alternatively, the target shared folder may be the automatically selected, such as a root of a directory tree for synchronized content items, or another automatically selected location.

When a user requests to add the content item to the shared folder, the content item is being accessed by the native application and the native application may have a handle or other file access association with the content item. To move the content item to the target shared shared folder, the client application 200 instructs 630 the process to save the content item to the target shared folder. The instruction to the process may be provided, for example, via an application programming interface, and specify a window of the content item and a path for the shared folder. In another example, rather than instruct the process to save the content item, the client application 200 instructs the process to close the content item at its existing location. The client application 200 copies the content item from its existing location to the target shared folder, and instructs the process to open the content item at the target shared folder. By moving the content item to the shared folder in this way, the content item may continue to be used by the user in the native application and the content item may be seamlessly added to the shared folder without interrupting normal use of the content item in the native application.

When the content item is saved to the target shared folder, a copy of the content item may still be stored at the prior location of the content item. The client application may delete the copy of the content item, or may leave the copy of the content item at the prior location.

When the content item is saved to the target shared folder, the content item is synchronized with other systems, such as client devices 110 and content management system 100 synchronizing that shared folder. While the content item is being synchronized, the synchronization interface is updated 650 to indicate that the content item is being synchronized. When the synchronization completes, the synchronization interface may be updated again to indicate that the content item has successfully been synchronized. At that point, additional options for interacting with the content item with respect to the synchronization may be available, such as sharing presence information with other users for the content item, sharing the content item to other users, and other uses of synchronized content items. To perform additional presence actions for the content item, the window events may subsequently be monitored 660 as discussed with respect to FIG. 4.

FIG. 7A-7D show example user interfaces displaying a content item added to a shared folder. These user interfaces may be generated, for example, by user interface module 202, and is one means for doing so. In this example, window 700 displays a content item, here "content item 7." This content item is not synchronized with a shared folder, and as described above, a synchronization interface 710 is displayed near the window 700. Synchronization interface 710 is shown in this example along a side portion of the window, though synchronization interface 710 may not overlap with the window 700 in some embodiments, or may dock to a side portion of the window. User interface module 202 may monitor the location of window 700 to place synchronization interface 710 at a position relative to window 700.

Figure 7A:
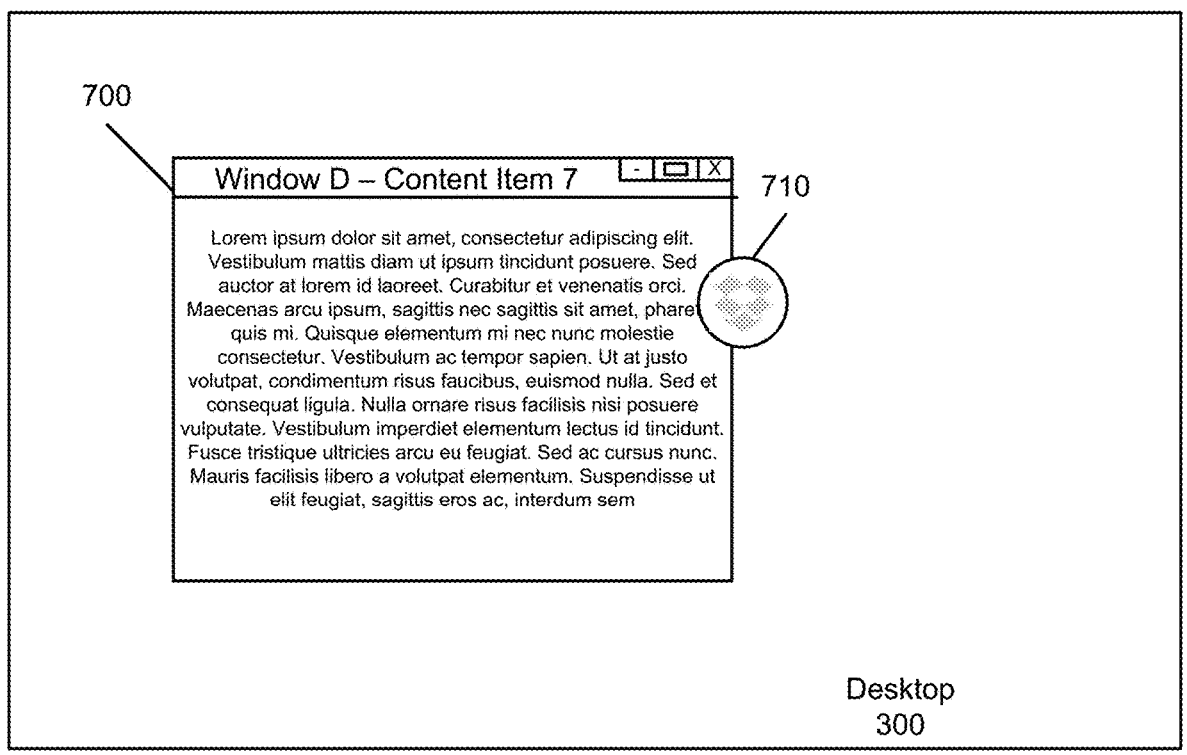
FIG. 7A-7D show example user interfaces displaying a content item added to a shared folder.

In the example shown in FIG. 7A, synchronization interface 710 displays an icon indicating that the content item is not a part of a shared folder. In this example, synchronization interface 710 displayed a grayed-out icon to represent that the content item is not shared, though other icons or indications may be used.

Figure 7B:
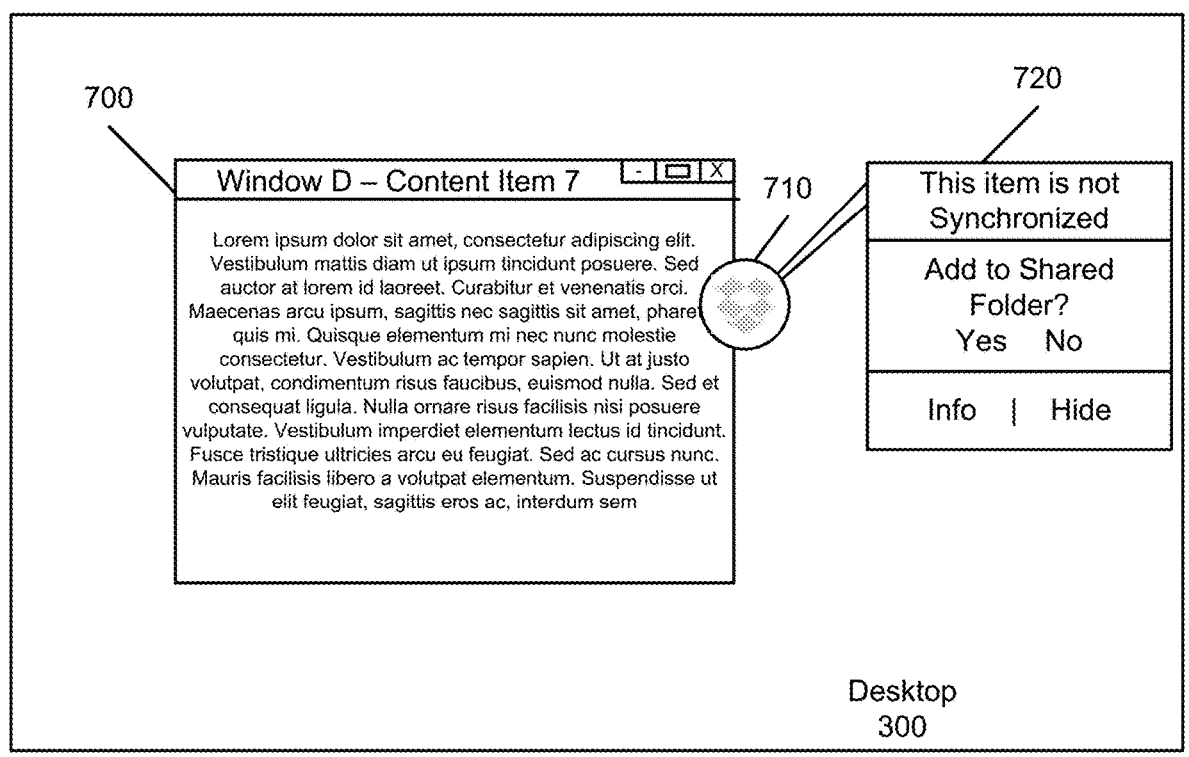

When a user interacts with synchronization interface 710, synchronization menu 720 may be displayed as shown in FIG. 7B. The user's interaction may include, for example, a click or selection of the synchronization interface 710, or may include a cursor maintained over the location of location interface 710 for a threshold period of time (e.g., "hovering"), or other interactions.

Synchronization menu 720 provides information to the user about the content item, such as "This item is not synchronized" and provides an option for the user to add the content item to the shared folder. When the user selects "yes" to add the content item to the shared folder, the content item may be added to the shared folder as described with respect to FIG. 6. In adition, an interface element may be provided (not shown) for a user to select the target shared folder to which to save the content item. When a user selects "No" the content item is not added to a shared folder, and synchronization menu 720 is closed. Sychronization menu 720 in this example also provides interfaces for additional information or to hide synchronization menu 720. When the user interacts with the interface for additional information ("Info"), additional information is displayed to the user, for example the advantages and features of synchronizing the content item. When the user interacts with the interface to "Hide," the synchronization menu 720 is closed, and the synchronization interface 710 also removed for this content item.

Figure 7C:
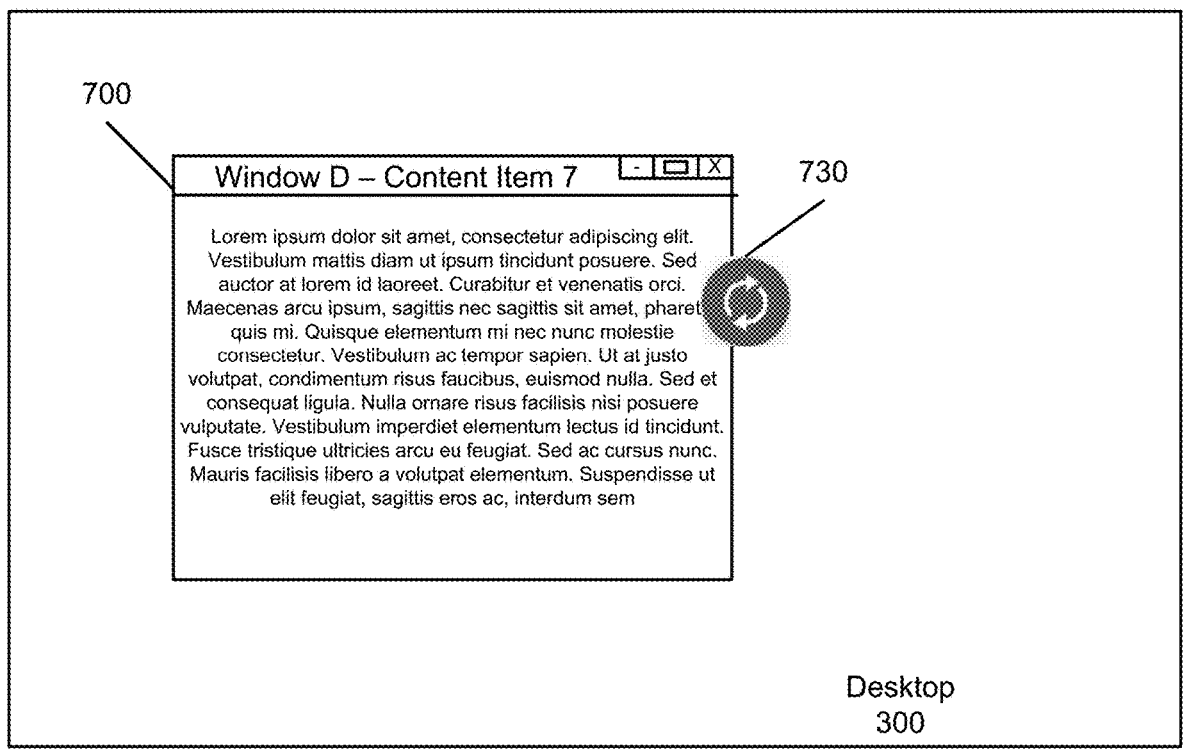

After the user selects "yes" and the content item is added to the shared folder, the synchronization menu 720 in this example is closed, and the closed, and the synchronization interface 710 changes to indicate a synchronization of the content item as shown in synchronization interface 730 in FIG. 7C. In this example, synchronization interface 730 displays circular arrows to indicate synchronization of the content item to other client devices 110 or content management system 100.

Figure 7D:
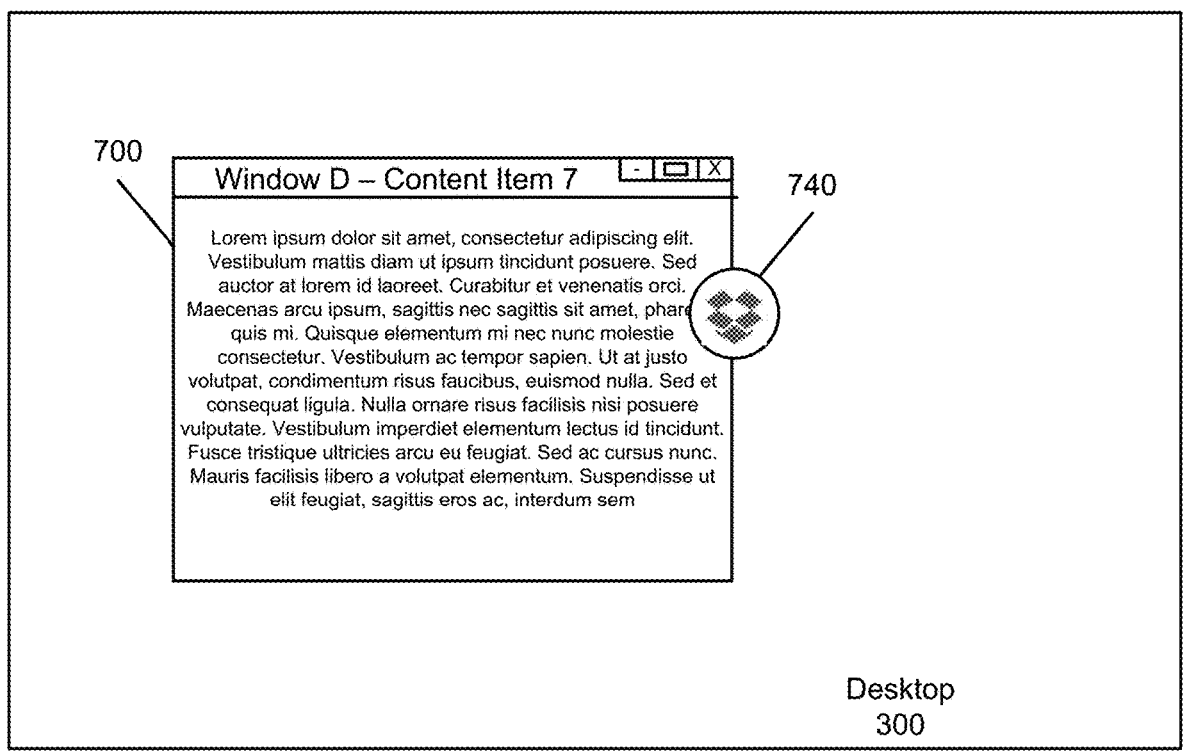

After the content item is synchronized, the synchronization interface is changed as shown in FIG. 7D. Synchronization interface 740 indicates that the content item is synchronized with other shared folders, and provides an indication with the native application that the content item has been successfully added to the shared folder and is synchronized with other devices. A user may further interact with synchronization interface 740, to access synchronization features for the content item, such as to provide presence information, versioning, notes, and other features of synchronized content provided by client application 200.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, by a client application installed on a client device, a monitoring event indicating a change in state of a user's presence, the monitoring event associated with a user interface element interacting with a content item and controlled by a native application installed on the client device, wherein the client application is independent of and not integrated into the native application;
   determining, by the client application, whether the content item is saved to a local folder of the client device that is not synchronized to a content management system, or is saved to a local folder of the client device that is synchronized to the content management system, the content management system being instantiated on one or more servers remote to the client device;
   responsive to determining that the content item is saved to the local folder of the client device that is not synchronized to the content management system, as opposed to being saved to the local folder of the client device that is synchronized to the content management system:
   generating for display, by the client application, a synchronization interface comprising a selectable option for a user to request synchronization of the content item to the content management system;
   receiving a selection of the selectable option to synchronize the content item from the synchronization interface; and
   in response to receiving the selection of the selectable option, adding the content item to a shared folder synchronized to the content management system.

2. The method of claim 1, wherein the content item is synchronized to one or more shared devices after receiving the request to synchronize the content item.

3. The method of claim 1, further comprising identifying a location of the shared folder.

4. The method of claim 3, wherein the location of the shared folder is specified by the user.

5. The method of claim 3, wherein the location of the shared folder is a root of a directory tree for synchronized content items.

6. The method of claim 1, wherein the monitoring event comprises saving the content item.

7. The method of claim 1, wherein the monitoring event comprises opening the content item.

8. The method of claim 1, wherein the synchronization interface is displayed adjacent to or overlapping with the user interface element.

9. The method of claim 1, wherein the content item is synchronized to one or more shared devices after receiving the request to synchronize the content item.

10. The method of claim 1, wherein the monitoring event comprises saving or opening the content item.

11. The method of claim 1, wherein the synchronization interface is displayed adjacent to or overlapping with the user interface element.

12. A non-transitory computer-readable medium containing instructions executable by one or more processors, the instructions when executed cause the one or more processors to:
   receive, by a client application installed on a client device, a monitoring event indicating a change in state of a user's presence, the monitoring event associated with a user interface element interacting with a content item and controlled by a native application installed on the client device, wherein the client application is independent of and not integrated into the native application;
   determine, by the client application, whether the content item is saved to a local folder of the client device that is not synchronized to a content management system, or is saved to a local folder of the client device that is synchronized to the content management system, the content management system being instantiated on one or more servers remote to the client device;
   responsive to determining that the content item is saved to the local folder of the client device that is not synchronized to the content management system, as opposed to being saved to the local folder of the client device that is synchronized to the content management system:
   generate for display, by the client application, a synchronization interface comprising a selectable option for a user to request synchronization of the content item to the content management system;
   receive a selection of the selectable option to synchronize the content item from the synchronization interface; and in response to receiving the selection of the selectable option, add the content item to a shared folder synchronized to the content management system.

13. The non-transitory computer-readable medium of claim 12, wherein the content item is synchronized to one or more shared devices after receiving the request to synchronize the content item.

14. The non-transitory computer-readable medium of claim 12, the instructions further causing the processor to identify a location of the shared folder.

15. The non-transitory computer-readable medium of claim 14, wherein the location of the shared folder is specified by the user.

16. The non-transitory computer-readable medium of claim 14, wherein the location of the shared folder is a root of a directory tree for synchronized content items.

17. The non-transitory computer-readable medium of claim 14, wherein the monitoring event comprises saving the content item.

18. The non-transitory computer-readable medium of claim 14, wherein the monitoring event comprises opening the content item.

19. The non-transitory computer-readable medium of claim 14, wherein the synchronization interface is displayed adjacent to or overlapping with the user interface element.

20. A system comprising:
one or more processors configured to execute instructions;
a non-transitory, non-volatile storage medium containing instructions, which when executed by the one or more processors cause the one or more processors to perform the steps of:
receiving, by a client application installed on a client device, a monitoring event indicating a change in state of a user's presence, the monitoring event associated with a user interface element interacting with a content item and controlled by a native application installed on the client device, wherein the client application is independent of and not integrated into the native application;
determining, by the client application, whether the content item is saved to a local folder of the client device that is not synchronized to a content management system, or is saved to a local folder of the client device that is synchronized to the content management system, the content management system being instantiated on one or more servers remote to the client device;
responsive to determining that the content item is saved to the local folder of the client device that is not synchronized to the content management system, as opposed to being saved to the local folder of the client device that is synchronized to the content management system:
generating for display, by the client application, a synchronization interface comprising a selectable option for a user to request synchronization of the content item to the content management system;
receiving a selection of the selectable option to synchronize the content item from the synchronization interface; and
in response to receiving the selection of the selectable option, adding the content item to a shared folder synchronized to the content management system.

* * * * *